(12) United States Patent
Goodwin

(10) Patent No.: US 10,383,412 B2
(45) Date of Patent: Aug. 20, 2019

(54) VENTED RING AND METHOD OF MANUFACTURING THE SAME

(71) Applicant: Peter Mark Goodwin, Port Alsworth, AK (US)

(72) Inventor: Peter Mark Goodwin, Port Alsworth, AK (US)

(73) Assignee: Groove Life Corporation, Spring Hill, TN (US)

( * ) Notice: Subject to any disclaimer, the term of this patent is extended or adjusted under 35 U.S.C. 154(b) by 0 days.

(21) Appl. No.: 15/936,188

(22) Filed: Mar. 26, 2018

(65) Prior Publication Data
US 2018/0206604 A1 Jul. 26, 2018

Related U.S. Application Data

(63) Continuation-in-part of application No. 15/229,493, filed on Aug. 5, 2016.

(60) Provisional application No. 62/246,925, filed on Oct. 27, 2015.

(51) Int. Cl.
| | |
|---|---|
| *A44C 9/00* | (2006.01) |
| *B29C 45/26* | (2006.01) |
| *B29C 45/14* | (2006.01) |
| *B29C 45/16* | (2006.01) |
| *B29K 21/00* | (2006.01) |
| *B29L 31/00* | (2006.01) |

(52) U.S. Cl.
CPC .......... *A44C 9/0053* (2013.01); *A44C 9/0007* (2013.01); *B29C 45/14065* (2013.01); *B29C 45/1615* (2013.01); *B29C 45/263* (2013.01); *B29C 45/14377* (2013.01); *B29C 2045/14131* (2013.01); *B29K 2021/003* (2013.01); *B29L 2031/7096* (2013.01); *B29L 2031/743* (2013.01)

(58) Field of Classification Search
CPC ....... A44C 9/00; A44C 9/0007; A44C 9/0015; A44C 9/0038; A44C 9/0053
USPC ...................................................... 63/15–15.4
See application file for complete search history.

(56) References Cited

U.S. PATENT DOCUMENTS

| | | | |
|---|---|---|---|
| 6,546,749 B1 * | 4/2003 | Canty | A44C 9/00 63/15 |
| D515,965 S | 2/2006 | D'Annunzio | |
| D516,451 S | 3/2006 | D'Annunzio | |
| D518,749 S | 4/2006 | D'Annunzio | |

(Continued)

*Primary Examiner* — Abigail E Troy
(74) *Attorney, Agent, or Firm* — Eric B. Fugett; Mark A. Pitchford; Pitchford Fugett, PLLC

(57) ABSTRACT

A vented finger ring and its method of manufacture are provided. The vented ring includes an outer ring portion, an inner ring portion, and an anti-stretch element positioned between the outer ring portion and the inner ring portion. The inner ring portion includes lateral grooves connected to inner grooves, the connected lateral grooves and inner grooves forming at least one fluid conduit from a first side of the vented ring to a second side of the vented ring. The method includes injecting a first material into a first mold to form an outer ring portion, injecting a second material into a second mold to form an inner ring portion, and positioning an anti-stretch element between the outer ring portion and the inner ring portion. The second mold includes at least one feature on a surface thereof, the at least one feature corresponding to connected lateral grooves and inner grooves on an inner surface of the inner ring portion.

19 Claims, 10 Drawing Sheets

(56) References Cited

U.S. PATENT DOCUMENTS

| | | | |
|---|---|---|---|
| 7,350,377 B2* | 4/2008 | Kaplan | A44C 5/0092 |
| | | | 63/15 |
| D750,994 S | 3/2016 | Baker et al. | |
| D751,447 S | 3/2016 | Baker et al. | |
| D751,448 S | 3/2016 | Baker et al. | |
| D780,615 S | 3/2017 | Baker et al. | |
| D784,182 S | 4/2017 | Baker et al. | |
| D789,231 S | 6/2017 | Baker et al. | |
| D789,232 S | 6/2017 | Baker et al. | |
| D789,233 S | 6/2017 | Baker et al. | |
| D789,234 S | 6/2017 | Baker et al. | |
| 9,943,146 B2 | 4/2018 | Baker et al. | |
| 2013/0091895 A1* | 4/2013 | Hwang | A44C 9/02 |
| | | | 63/15.1 |
| 2014/0083135 A1* | 3/2014 | Martinez | A44C 9/0092 |
| | | | 63/15.8 |

* cited by examiner

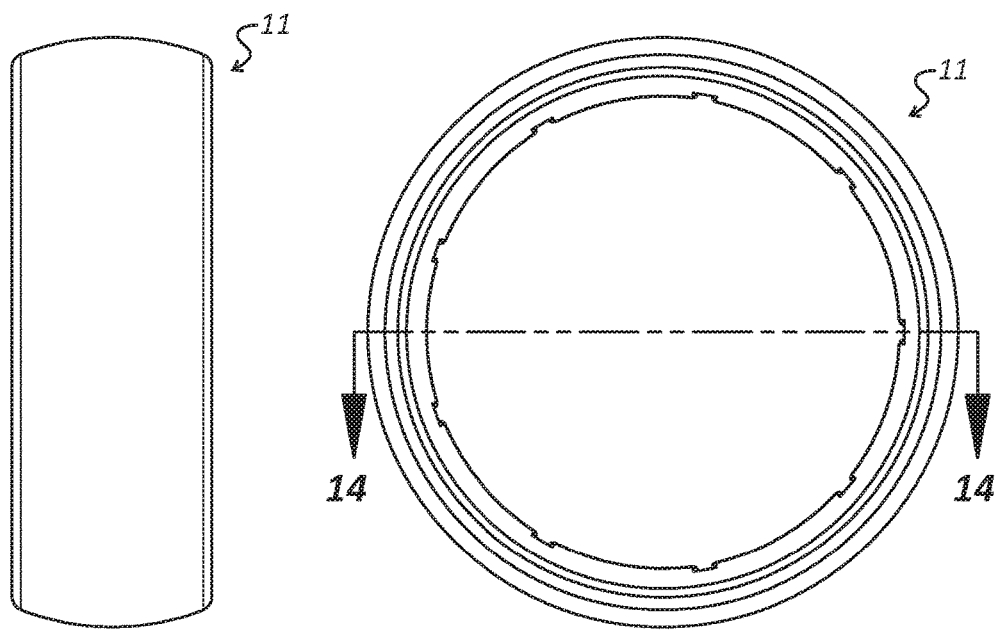
FIG. 12   FIG. 13
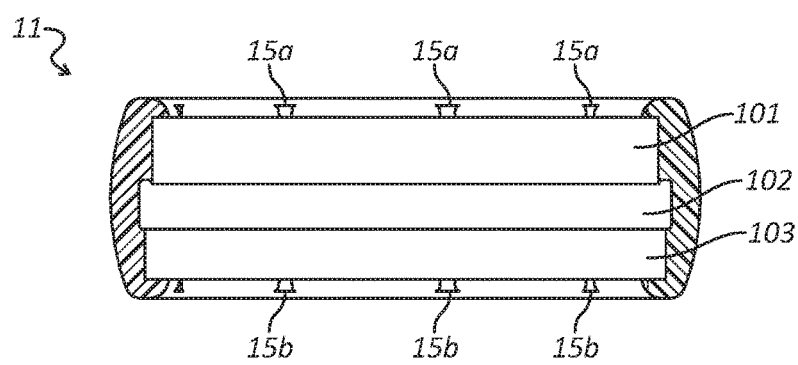
FIG. 14

VENTED RING AND METHOD OF MANUFACTURING THE SAME

RELATED APPLICATIONS

This application is a continuation-in-part of U.S. patent application Ser. No. 15/229,493, filed Aug. 5, 2016, which claims priority from U.S. Provisional Application Ser. No. 62/246,925, filed Oct. 27, 2015, the entire disclosures of which are incorporated herein by this reference.

TECHNICAL FIELD

The presently-disclosed subject matter generally relates to vented rings and methods of forming the same. More specifically, the presently-disclosed subject matter relates to flexible and/or elastic vented rings and methods of forming the same.

BACKGROUND

Traditional rings are typically made of gold, platinum, silver, or other precious metals. These materials are often chosen due to both appearance and durability. However, due to their inherent strength, metal rings are the source of many injuries. More specifically, in the unfortunate event that a user catches their metal ring on something, it can cause bruising, avulsion, or even amputation of the associated digit. This problem is particularly prevalent in athletes and other physically active individuals.

In an attempt to avoid injury, it has been suggested that the individual wear their ring on a chain around their neck. While this would protect the individuals finger or toe, most people are not interested in permanently converting their ring into a necklace, nor is it possible to predict all activities which may result in injury so that a wearer could remove the ring prior to engaging in such activities. In view thereof, silicone rings have been proposed as a possible alternative to metal rings. Although silicone rings have the potential to reduce injury, they are nonporous and occlusive. By not allowing the skin to breathe, existing silicone rings cause sweating, pruning, bleaching, pealing, and/or possibly infection. Additionally, existing silicone rings are bulky and uncomfortable, which actually increases the tendency of the ring to catch on other objects.

Accordingly, there remains a need for rings which reduce the possibility of injury while remaining comfortable to wear.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

In some embodiments, the presently-disclosed subject matter is directed to a vented ring including an outer ring portion, an inner ring portion, and an anti-stretch element positioned between the outer ring portion and the inner ring portion, wherein the inner ring portion includes lateral grooves connected to inner grooves, the connected lateral grooves and inner grooves forming at least one fluid conduit from a first side of the vented ring to a second side of the vented ring. In one embodiment, the outer ring portion comprises a first elastomer. In another embodiment, the inner ring portion comprises a second elastomer. In a further embodiment, the first elastomer and the second elastomer are the same. In an alternate embodiment, the first elastomer and the second elastomer are different.

In some embodiments, the anti-stretch element is plastic. In some embodiments, the anti-stretch element further comprises a notch formed therein. In some embodiments, the anti-stretch element is circular. In some embodiments, the anti-stretch element is "C" shaped.

In some embodiments, the vented ring further comprises a design on an outer surface of the outer ring portion. In one embodiment, the design is a logo. In some embodiments, the ring is a finger ring. In some embodiments, the ring is a toe ring. In some embodiments, the vented ring is configured to break when pressure is applied. In some embodiments, the inner ring portion further comprises decorative inner grooves.

Also provided herein, in some embodiments, is a method of forming a vented ring, the method including injecting a first material into a first mold to form an outer ring portion, injecting a second material into a second mold to form an inner ring portion, and positioning an anti-stretch element between the outer ring portion and the inner ring portion, wherein the second mold includes at least one feature on a surface thereof, the at least one feature corresponding to connected lateral grooves and inner grooves on an inner surface of the inner ring portion. In some embodiments, the first material and the second material are elastomers. In one embodiment, the elastomers are different. In some embodiments, the step of injecting the second material includes placing the second material in contact with the first material, directly bonding the second material to the first material. In one embodiment, the step of positioning the anti-stretch element is performed after the step of injecting the first material and before the step of injecting the second material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are used, and the accompanying drawings of which:

FIG. 12 shows a front view of the outer ring portion in FIG. 10 according to an embodiment of the disclosure.

FIG. 13 shows a side view of the outer ring portion in FIG. 10 according to an embodiment of the disclosure.

FIG. 14 shows an enlarged sectional view of the outer ring portion in FIG. 10 according to an embodiment of the disclosure, the sectional view being taken along line 14-14 of FIG. 13.

DESCRIPTION OF EXEMPLARY EMBODIMENTS

Figure 1:
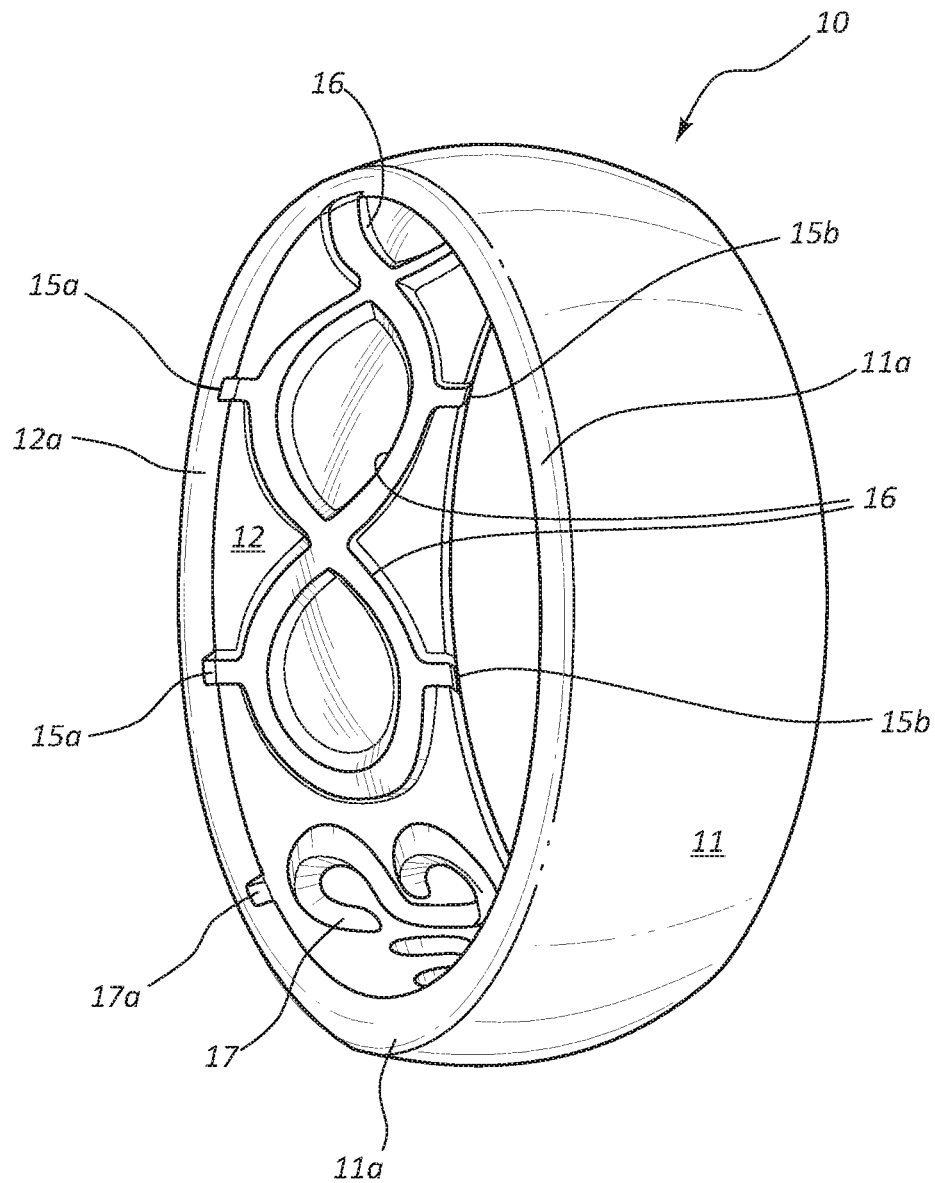
FIG. 1 shows a perspective view of a first side of a vented ring according to an embodiment of the disclosure.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are described herein.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The presently-disclosed subject matter includes vented and/or decorative rings and methods of forming the same. In some embodiments, as illustrated in FIGS. 1-8, the vented and/or decorative ring 10 includes an outer ring portion 11 and an inner ring portion 12. In one embodiment, the outer ring portion 11 and the inner ring portion 12 are formed from any suitable material configured to break or tear when a force less than that required to injure a wearer's finger or toe is applied thereto. Suitable materials include, but are not limited to, silicone, rubber, nylon, flexible plastic (e.g., flexible polyvinyl chloride (PVC) plastic, flexible thermoplastic polyurethane (TPU) plastic), any other suitable elastomer or flexible material, or a combination thereof. By forming the vented ring 10 from materials configured to break upon application of force, as compared to existing metal rings, the vented ring 10 reduces or eliminates injury to the wearer upon catching, snagging, or other pulling of the ring while being worn. Although the elastomer materials above a preferred, as will be appreciated by those skilled in the art, other materials, including metals, may still be used and are expressly contemplated herein.

Figure 2:
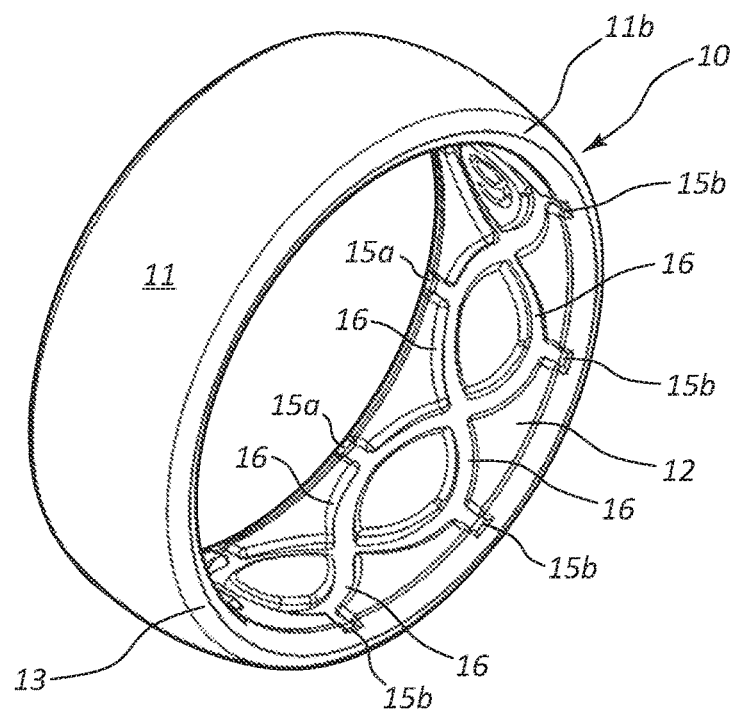
FIG. 2 shows a perspective view of a second side of the vented ring shown in FIG. 1.
Figure 3:
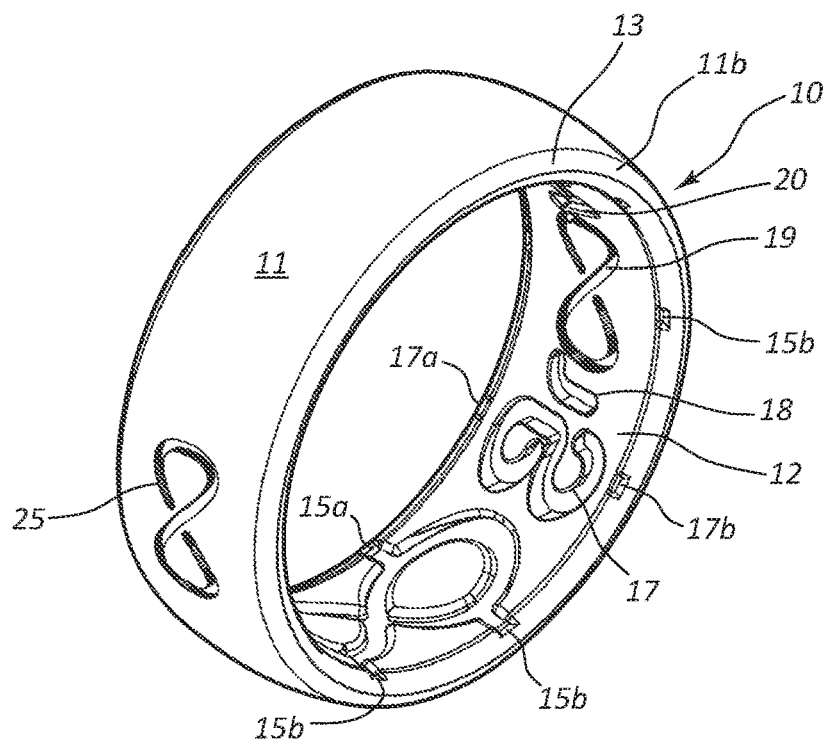
FIG. 3 shows a perspective view of a vented ring according to another embodiment of the disclosure.
Figure 4:
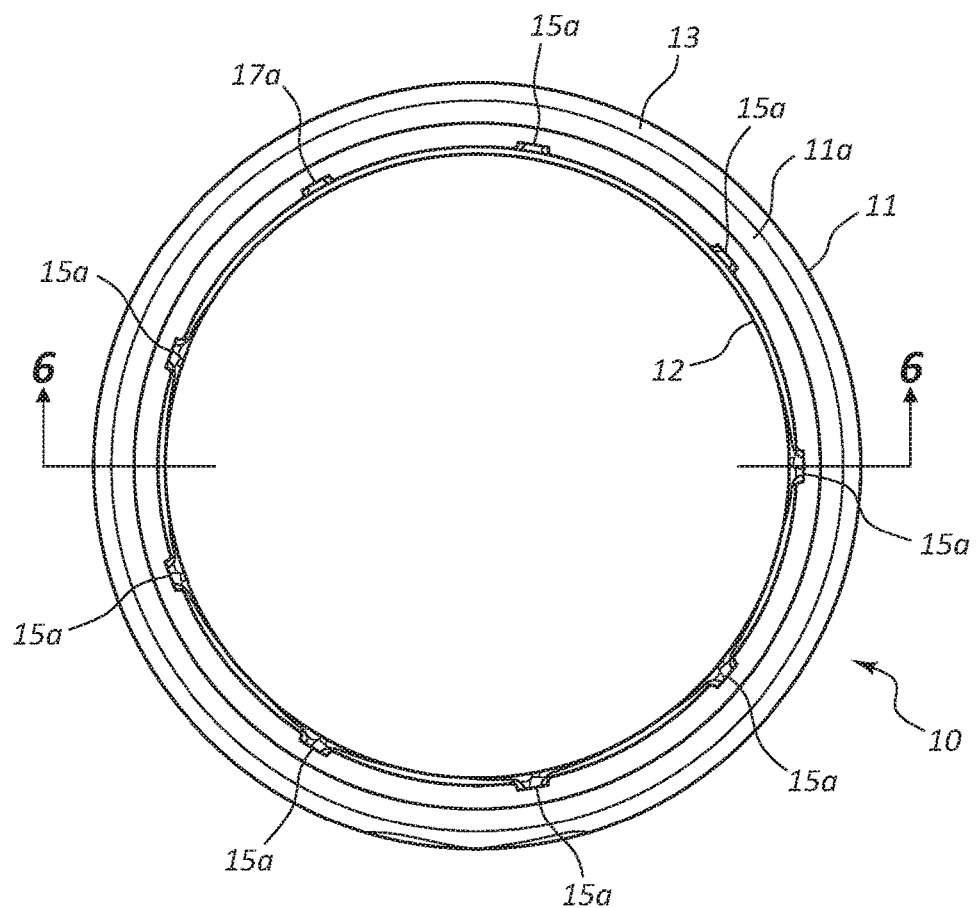
FIG. 4 shows a side view of a vented ring according to an embodiment of the disclosure.
Figure 5:
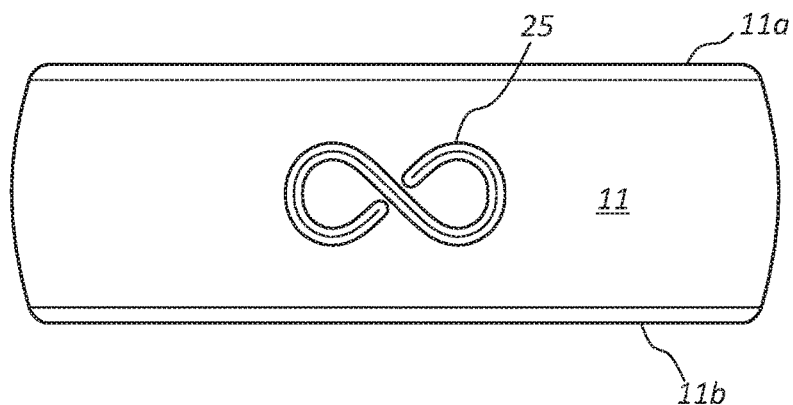
FIG. 5 shows a top view of a vented ring according to an embodiment of the disclosure.

The vented ring 10 includes any suitable shape, geometry, and/or design. For example, in one embodiment, the outer ring portion 11 and/or the inner ring portion 12 may independently be opaque, colored, or clear. In another embodiment, as shown in FIGS. 1-2, an outer surface of the outer ring portion 11 is substantially smooth and unmarked. In a further embodiment, as shown in FIGS. 1-4, the outer ring portion 11 includes beveled and/or rounded edges 13. Additionally or alternatively, as shown in FIGS. 3 and 5, the outer surface of the outer ring portion 11 may include one or more decorative elements 25 formed thereon and/or therein. Suitable decorative elements 25 include, but are not limited to, an infinity symbol, a logo (e.g., a university logo), text, or any other decorative design and/or symbol.

Referring to FIGS. 1-4 and 6-8, in some embodiments, the inner ring portion 12 is fitted within the outer ring portion 11 to form the vented ring 10. In one embodiment, the inner ring portion 12 and the outer ring portion 11 are joined together to form the vented ring 10. As discussed in detail below, the inner ring portion 12 may be positioned within the outer ring portion 11, or the inner ring portion 12 may be formed directly within the outer ring portion 11 during manufacturing.

In some embodiments, the vented ring 10 also includes one or more slots or grooves formed on an inner surface thereof. For example, in one embodiment, the vented ring 10 includes lateral slots or grooves 15a extending inwardly from an outer edge of a first side 11a of the outer ring portion 11 and/or a first side 12a of the inner ring portion 12, and lateral slots or grooves 15b extending inwardly from an outer edge of a second side 11b of the outer ring portion 11 and/or a second side 12b of the inner ring portion 12. In another embodiment, the lateral slots or grooves 15a and 15b connect to inner slots or grooves 16 extending along the inner surface of the inner ring portion 12. The inner slots or grooves 16 include any suitable shape and/or geometry for connecting at least one pair of the lateral slots or grooves 15a and 15b, such as, but not limited to, circles, ellipses, triangles, or any other shape/design that connects at least one pair of the lateral slots or grooves 15a and 15b. In certain embodiments, the inner slots or grooves 16 are linked, as with the linked elliptical slots or grooves illustrated in FIGS. 1-4 and 6-8.

Figure 7:
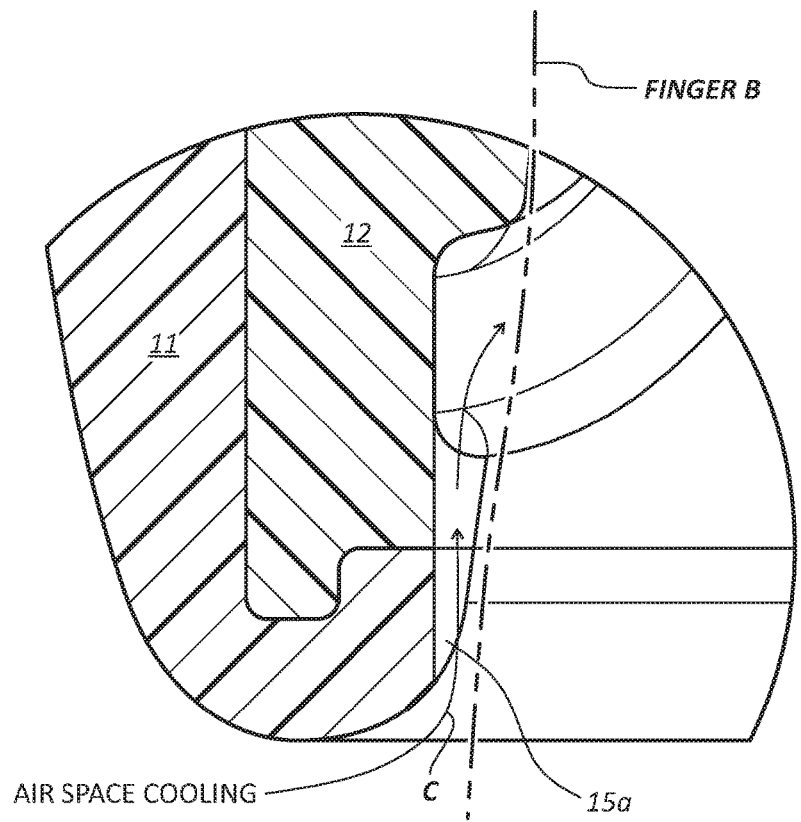
FIG. 7 shows an enlarged end sectional view of a vented ring according to an embodiment of the disclosure, the end sectional view corresponding to circle A of FIG. 6.

Together, the lateral slots or grooves 15a and 15b in connection with the inner slots or grooves 16 form at least one fluid conduit and/or passageway over the inner surface of the vented ring 10 that facilitates a flow of fluid, such as air, from one side of the vented ring 10 to the other. For example, in one embodiment, as best illustrated in FIG. 7, air enters the lateral slots or grooves 15a, travels into the inner slots or grooves 16, and exits through lateral slots or grooves 15b to provide AIR SPACE COOLING, which is identified with arrows C. When the vented ring 10 is worn on a user's finger or toe this flow of air through the fluid conduit(s) and/or passageway(s) provides a breathing and/or cooling effect to the skin under the vented ring 10, which reduces or eliminates the sweating, wrinkling, bleaching, and/or peeling, sometimes referred to as "pickling," as well as other issues associated with existing rings. The lateral slots or grooves 15a and 15b in connection with the inner slots or grooves 16 also reduce or eliminate the entrapment of liquid, such as water and/or sweat, under the vented ring 10.

Figure 8:
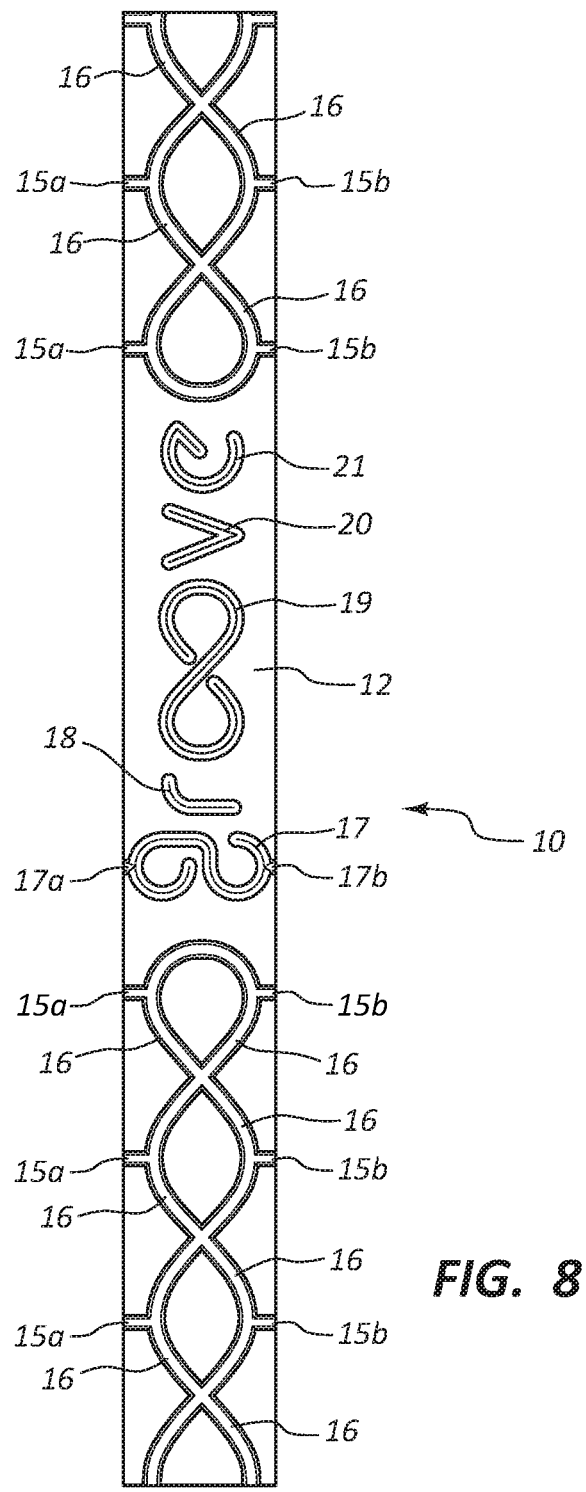
FIG. 8 shows a flattened view of an inner surface of a vented ring according to an embodiment of the disclosure.

Additionally or alternatively, the slots or grooves may include lateral slots or grooves 17a and 17b connected to a stylized inner slot or groove 17 to facilitate a flow of fluid from one side of the vented ring 10 to the other. For example, lateral slots or grooves 17a and 17b may be connected to a stylized letter G, as illustrated in FIGS. 1, 3, and 8. Similar to lateral slots or grooves 15a and 15b above, lateral slots or grooves 17a extend inwardly from the outer edge of the first side 11a of the outer ring portion 11 and/or the first side 12a of the inner ring portion 12, and lateral slots or grooves 17b extending inwardly from the outer edge of the second side 11b of the outer ring portion 11 and/or the second side 12b of the inner ring portion 12.

Figure 6:
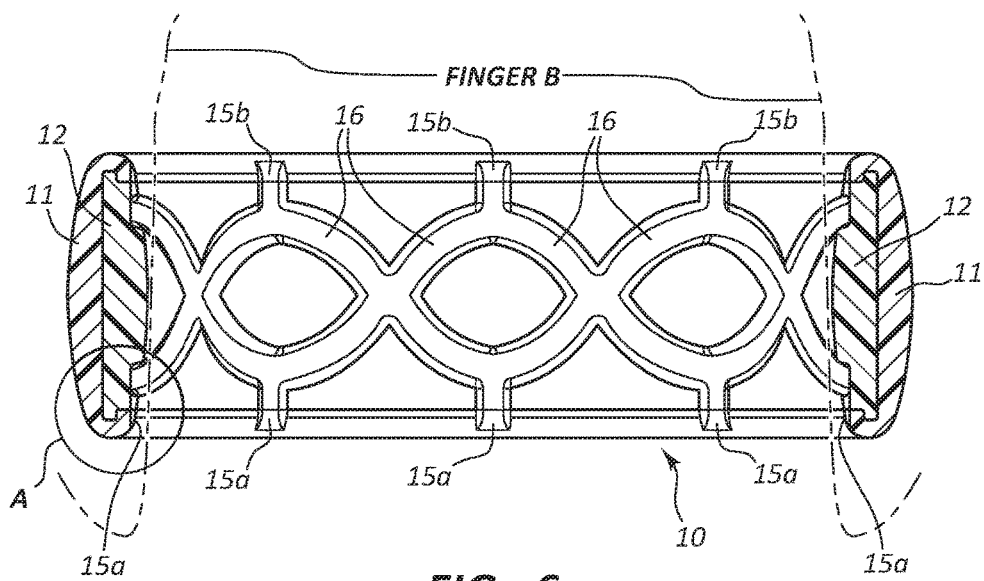
FIG. 6 shows an enlarged sectional view of a vented ring according to an embodiment of the disclosure, the sectional view being taken along line 6-6 of FIG. 4. Broken lines B illustrate a section of a wearer's finger.

As will be appreciated by those skilled in the art, although the inner slots or grooves 16 and the stylized inner slot or groove 17 are shows as linked elliptical slots or grooves and a stylized letter G, respectively, the disclosure is not so limited any may include any other suitable shape or geometry suitable for permitting fluid flow across the inner surface of the vented ring 10. As will also be appreciated by those skilled in the art, although the lateral slots or grooves 15a and 15b, as well as 17a and 17b, are shows as being aligned, they are not so limited and may be off-set by any amount so long as they permit fluid flow across the inner surface of the vented ring 10 when connected to the inner slots or grooves 16 or the stylized inner slot or groove 17, respectively. For example, although FIGS. 6 and 8 show aligned lateral slots or grooves 15a and 15b connected to each elliptical slot or groove of the inner slots or grooves 16, the lateral slots or grooves 15a and 15b may be offset with respect to each elliptical slot or groove and/or one or more elliptical slot or groove may only be connected to one lateral slot or groove 15a or 15b. Since, in this embodiment, the inner slots or grooves 16 are interconnected, one lateral slot or groove 15a connected to a first elliptical slot or groove and one lateral slot or groove 15b connected to a second elliptical slot or groove would still permit fluid flow across the inner surface of the vented ring 10.

In some embodiment, as best illustrated in FIG. 8, the inner ring 12 may include decorative slots or grooves that do not connect to lateral slots or grooves. Examples of such decorative slots or grooves are shown as a lower case letter "r," identified as 18; a pair of "O"s formed as an infinity symbol 19; a lower case letter "v," identified as 20; and a lower case letter "e," identified as 21. Together, the stylized inner slot or groove 17 along with the decorative slots or grooves 18 through 21 spell out the word "Groove."

Figure 10:
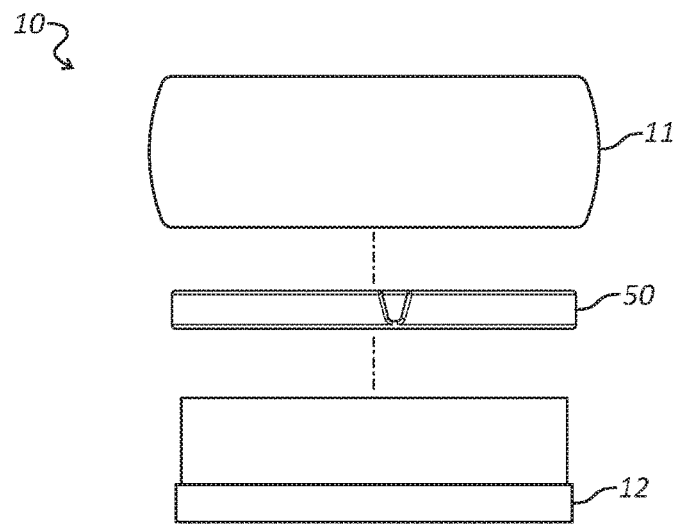
FIG. 10 shows an exploded view of a vented ring according to an embodiment of the disclosure.
Figure 11:
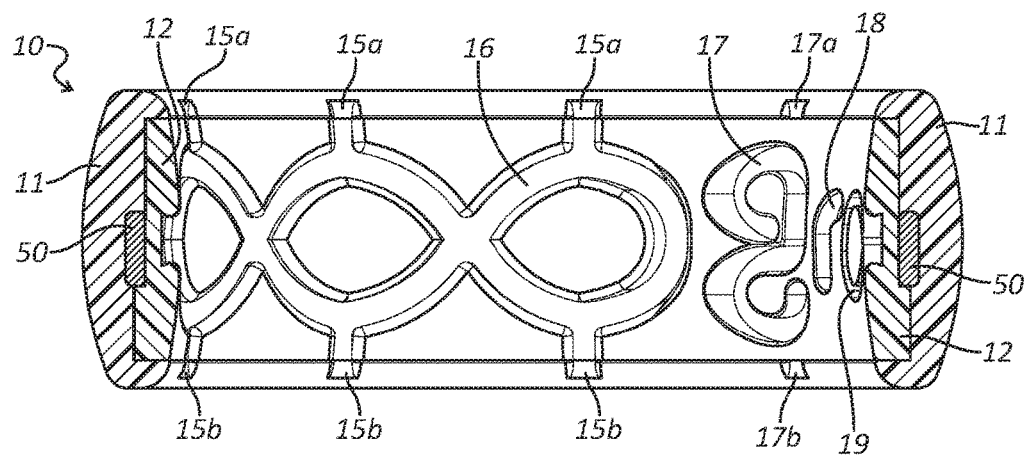
FIG. 11 shows an enlarged sectional view of the vented ring of FIG. 10 according to an embodiment of the disclosure.

Turning to FIGS. 10-19, in some embodiments, the vented ring 10 includes an anti-stretch element 50. Referring to FIGS. 10-11, in one embodiment, the anti-stretch element 50 is positioned between the outer ring portion 11 and the inner ring portion 12, the outer ring portion 11 and the inner ring portion 12 holding the anti-stretch element 50 in place. In another embodiment, the anti-stretch element 50 is not visible in the final vented ring 10. In a further embodiment, the anti-stretch element 50 provides rigidity to the vented ring 10, reducing or eliminating stretching and/or relaxing of the outer ring portion 11 and the inner ring portion 12. For example, in certain embodiments, the anti-stretch element 50 is formed from a material having increased rigidity as compared to the elastomer(s) and/or other flexible materials of the outer ring portion 11 and the inner ring portion 12. Such materials include, but are not limited to, nylon, rigid silicone, rigid plastic (e.g., rigid PVC plastic, rigid TPU plastic), any other suitable material having increased rigidity as compared to the outer ring portion 11 and the inner ring portion 12, or a combination thereof.

Figure 15:
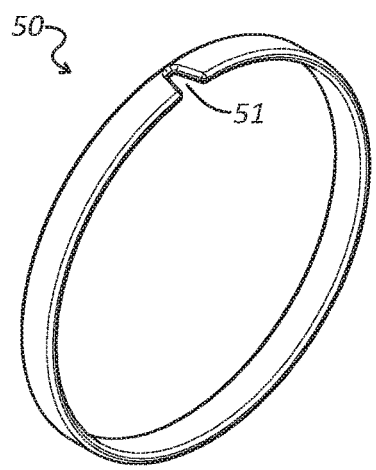
FIG. 15 shows a perspective view of the insert in FIG. 10 according to an embodiment of the disclosure.
Figure 16:
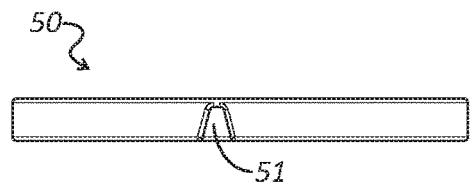
FIG. 16 shows a top view of the insert in FIG. 10 according to an embodiment of the disclosure.

As illustrated in FIGS. 15-16, in one embodiment, the anti-stretch element 50 is circular and/or forms a ring. In another embodiment, the anti-stretch element 50 includes a notch or break 51 formed therein. When in use, the notch or break 51 creates a weak point in the anti-stretch element 50 in order to facilitate breaking of the vented ring 10 when pressure is applied thereto. Accordingly, although shown as a "V" shaped opening in FIGS. 15-16, the notch or break 51 is not so limited and may include any other suitable shape or size suitable for forming a weak point. Other suitable shapes or sizes include, but are not limited to, rectangular openings, square openings, perforations, scores, or a combination thereof. In a further embodiment, the anti-stretch element 50 includes more than one notch or break 51 formed therein. Additionally or alternatively, the anti-stretch element 50 may have an open gap formed therein, such that the anti-stretch element 50 does not form a complete circle or ring. For example, the anti-stretch element 50 may be "C" shaped rather than completely circular. In such embodiments, the anti-stretch element 50 may still include one or more notches or breaks 51 formed therein, allowing the anti-stretch element 50 to open or break at a point other than the gap formed therein.

Figure 17:
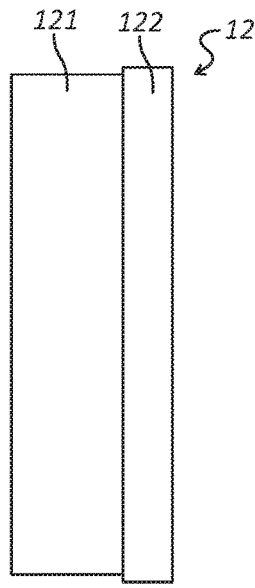
FIG. 17 shows a front view of the inner ring portion in FIG. 10 according to an embodiment of the disclosure.
Figure 18:
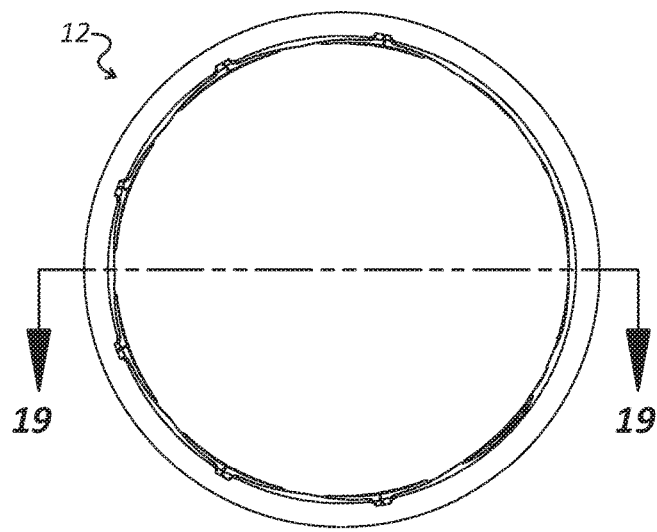
FIG. 18 shows a side view of the inner ring portion in FIG. 10 according to an embodiment of the disclosure.
Figure 19:
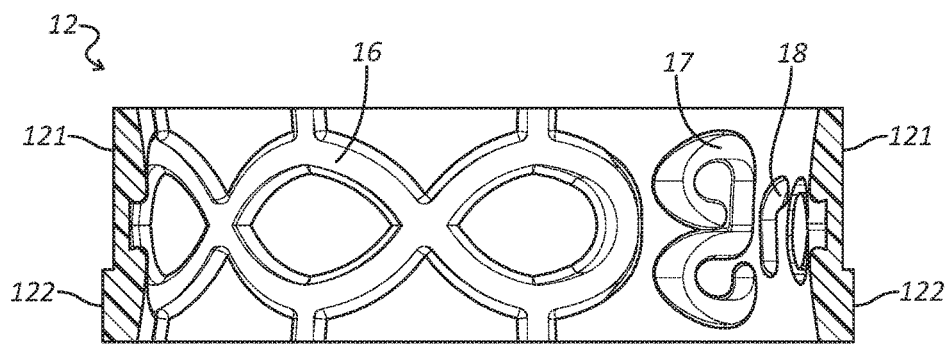
FIG. 19 shows an enlarged sectional view of the inner ring portion in FIG. 10 according to an embodiment of the disclosure, the sectional view being taken along line 19-19 of FIG. 18.

In some embodiments, the outer ring portion 11 and/or the inner ring portion 12 are formed to accommodate the anti-stretch element 50. In one embodiment, for example, as illustrated in FIGS. 12-14, the inner surface of the outer ring portion 11 includes a first outer ring section 101, a second outer ring section 102, and a third outer ring section 103, with at least one of the outer ring sections having a different height from the other outer ring sections. Referring to FIGS. 17-19, in another embodiment, the inner ring portion 12 includes a first inner ring section 121 and a second inner ring section 122. In a further embodiment, the height of the first outer ring section 101 corresponds to the first inner ring section 121, the anti-stretch element 50 is positioned between the second outer ring section 102 and the first inner ring section 121, and the height of the third outer ring section 103 corresponds to the second inner ring section 122. In such embodiments, the anti-stretch element 50 is held between the outer ring portion 11 and the inner ring portion 12. Additionally or alternatively, in certain embodiments, the inner surface of the outer ring portion 11 includes side walls configured to contact the inner ring portion 12 and form a flush or substantially flush inner surface of the vented ring 10.

Figure 9:
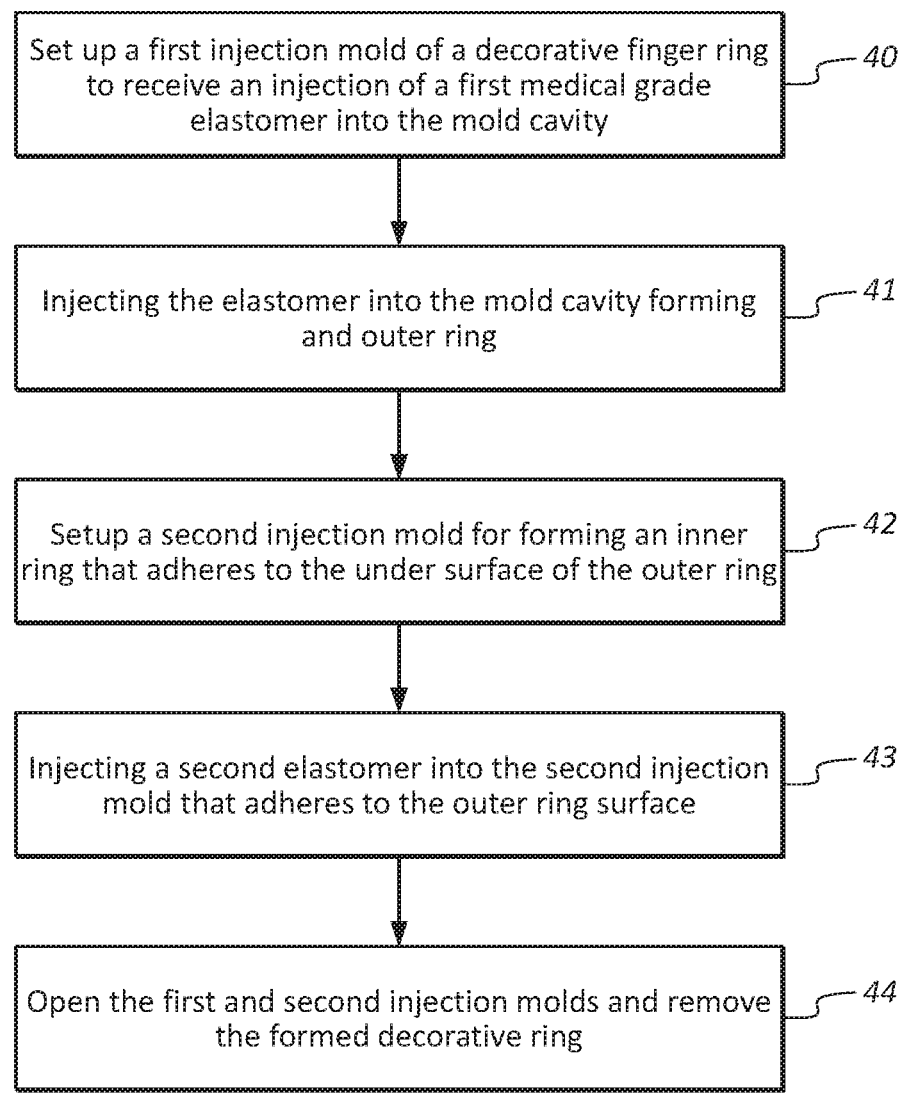
FIG. 9 shows a schematic view of a method of manufacturing a vented ring according to an embodiment of the disclosure.

Also provided herein is a method of forming the vented ring 10 according to one or more of the embodiments disclosed herein. In some embodiments, the method of forming the vented ring 10 includes co-injection molding of the outer ring portion 11 and the inner ring portion 12. An example of a co-injection molding procedure is illustrated schematically in FIG. 9. In one embodiment, the first step includes setting up a first injection mold of the vented ring to receive an injection of a first material into the mold cavity (step 40). Next, the first material is injected into the mold cavity (step 41) to form the outer ring portion 11 of the vented ring 10. In step 42, a second injection mold is set up for forming the inner ring portion 12. A second material is then injected into the second injection mold (step 43). In some embodiments, the second material adheres directly to the first material, bonding the inner ring portion 12 to the outer ring portion 11 and forming the vented ring 10. Thereafter, the first and second injection molds are removed (step 44). Alternatively, the outer ring portion 11 and the inner ring portion 12 may be formed separately and then joined to form the vented ring 10. Although discussed above with regard to forming the outer ring portion 11 and then the inner ring portion 12, as will be appreciated by those skilled in the art, the disclosure is not so limited and the steps may be performed in any order. Furthermore, at any point in the process, the anti-stretch element 50 is optionally positioned between the first material of the outer ring portion 11 and the second material of the inner ring portion 12.

The first material and the second material include any suitable material for forming the outer ring portion 11 and the inner ring portion 12, respectively. These materials may be the same or different, depending upon the desired design, shape, and/or feel of the ring. In some embodiments, the first mold and/or the second mold includes one or more features formed on a surface thereof, the one or more features corresponding to a design of the outer ring portion 11 and/or the inner ring portion 12. When such features are present, the first or second material flows into (e.g., depressions) and/or around (e.g., ridges) the features to form corresponding designs, slots, and/or grooves in the outer ring portion 11 and/or the inner ring portion 12. For example, in one embodiment, the first mold may be smooth or include features corresponding to a desired design on the outer surface of the outer ring portion 11. In another embodiment, the second mold includes features corresponding to the slots and grooves in the inner surface of the inner ring portion 12. Accordingly, utilization of the co-injection molding process facilitates the adoption of a multitude of design features in the vented ring 10, such as, but not limited to, forming design features on the outer surface of the outer ring 11 and/or forming a wide variety of slots or grooves in the inner surface of the inner ring 12. Although discussed above with regard to co-injection molding, as will be appreciated by those skilled in the art, the disclosure is not so limited and may include any other suitable method or combination of methods for forming the outer ring portion 11 and the inner ring portion 12.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A vented ring comprising:
   a flexible outer ring portion;
   a flexible inner ring portion; and
   an anti-stretch element positioned between the outer ring portion and the inner ring portion, the anti-stretch element having increased rigidity relative to the inner and outer ring portions;
   wherein the inner ring portion includes lateral grooves connected to inner longitudinal grooves, the connected lateral grooves and inner longitudinal grooves forming at least one fluid conduit from a first side of the vented ring to a second side of the vented ring.

2. The vented ring of claim 1, wherein the outer ring portion comprises a first elastomer.

3. The vented ring of claim 2, wherein the inner ring portion comprises a second elastomer.

4. The vented ring of claim 3, wherein the first elastomer and the second elastomer are the same.

5. The vented ring of claim 3, wherein the first elastomer and the second elastomer are different.

6. The vented ring of claim 1, wherein the anti-stretch element is plastic.

7. The vented ring of claim 1, wherein the anti-stretch element further comprises a notch formed therein.

8. The vented ring of claim 1, wherein the anti-stretch element is circular.

9. The vented ring of claim 1, further comprising a design on an outer surface of the outer ring portion.

10. The vented ring of claim 9, wherein the design is a logo.

11. The vented ring of claim 1, wherein the ring is a finger ring.

12. The vented ring of claim 1, wherein the ring is a toe ring.

13. The vented ring of claim 1, wherein the vented ring is configured to break when pressure is applied.

14. The vented ring of claim 1, wherein the inner ring portion further comprises decorative inner grooves.

15. A method of forming a vented ring, the method comprising:
   injecting a first material into a first mold to form a flexible outer ring portion;
   injecting a second material into a second mold to form a flexible inner ring portion; and
   positioning an anti-stretch element between the outer ring portion and the inner ring portion, the anti-stretch element having increased rigidity relative to the inner and outer ring portions;
   wherein the second mold includes at least one feature on a surface thereof, the at least one feature corresponding to connected lateral grooves and inner longitudinal grooves on an inner surface of the inner ring portion.

16. The method of claim 15, wherein the first material and the second material are elastomers.

17. The method of claim 16, wherein the elastomers are different.

18. The method of claim 15, wherein the step of injecting the second material includes placing the second material in contact with the first material, directly bonding the second material to the first material.

19. The method of claim 18, wherein the step of positioning the anti-stretch element is performed after the step of injecting the first material and before the step of injecting the second material.

* * * * *